(12) United States Patent
Jain et al.

(10) Patent No.: US 10,237,847 B2
(45) Date of Patent: Mar. 19, 2019

(54) ENHANCED PAGING MECHANISM FOR CELLULAR INTERNET OF THINGS

(71) Applicant: Intel IP Corporation, Santa Clara, CA (US)

(72) Inventors: Puneet Jain, Hillsboro, OR (US); Sneha Nagarajan, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/758,246

(22) PCT Filed: Apr. 1, 2016

(86) PCT No.: PCT/US2016/025741
§ 371 (c)(1),
(2) Date: Mar. 7, 2018

(87) PCT Pub. No.: WO2017/058287
PCT Pub. Date: Apr. 6, 2017

(65) Prior Publication Data
US 2018/0263013 A1    Sep. 13, 2018

Related U.S. Application Data

(60) Provisional application No. 62/236,786, filed on Oct. 2, 2015.

(51) Int. Cl.
*H04W 68/04* (2009.01)
*H04W 68/00* (2009.01)
*H04W 4/02* (2018.01)

(52) U.S. Cl.
CPC ............ *H04W 68/04* (2013.01); *H04W 4/02* (2013.01); *H04W 68/005* (2013.01)

(58) Field of Classification Search
CPC ......... H04W 4/02; H04W 4/029; H04W 4/70; H04W 64/00; H04W 68/04; H04W 68/005
See application file for complete search history.

(56) References Cited

U.S. PATENT DOCUMENTS

| | | | |
|---|---|---|---|
| 2010/0215001 A1* | 8/2010 | Russell | H04L 63/062 370/329 |
| 2016/0007316 A1* | 1/2016 | Vaidya | H04W 68/02 370/312 |
| 2018/0192234 A1* | 7/2018 | Mohamed | H04L 67/18 |

OTHER PUBLICATIONS

3GPP TR 23.789 V13.0.0; Technical Specification Group Services and System Aspects; Monitoring Enhancements (Release 13) (Mar. 2015).

(Continued)

*Primary Examiner* — Daniel Lai
(74) *Attorney, Agent, or Firm* — Thorpe North & Western

(57) ABSTRACT

Technology for a mobility management entity (MME) operable to facilitate paging message transmissions using a user equipment (UE) location is disclosed. The MME can process data received for a user equipment (UE) from a Service Capability Exposure Function (SCEF). The downlink data can include a public land mobile network (PLMN) UE location associated with the UE location. The MME can compare at least one of a time stamp and a granularity level of the PLMN UE location to existing location area information for the UE. The MME can determine to overwrite the existing location area information for the UE with the PLMN UE location. The UE can generate a paging message for transmission only to an eNodeB associated with the PLMN UE location, and the eNodeB can be configured to forward the paging message to the UE.

21 Claims, 10 Drawing Sheets

(56) References Cited

OTHER PUBLICATIONS

3GPP TR 23.720 V1.0.0; Architecture enhancements for Cellular Internet of Things (Release 13) (Sep. 2015).
3GPP TR 23.888 V11.0.0; System improvements for Machine-Type Communications (MTC) (Release 11) (Sep. 2012).
3GPP TS 23.682 V133.0; Architecture enhancements to facilitate communications with packet data networks and applications (Release 13) (Sep. 2015).

* cited by examiner

ENHANCED PAGING MECHANISM FOR CELLULAR INTERNET OF THINGS

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 1902.16 standard (e.g., 1902.16e, 1902.16m), which is commonly known to industry groups as WiMAX (Worldwide interoperability for Microwave Access), and the IEEE 1902.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
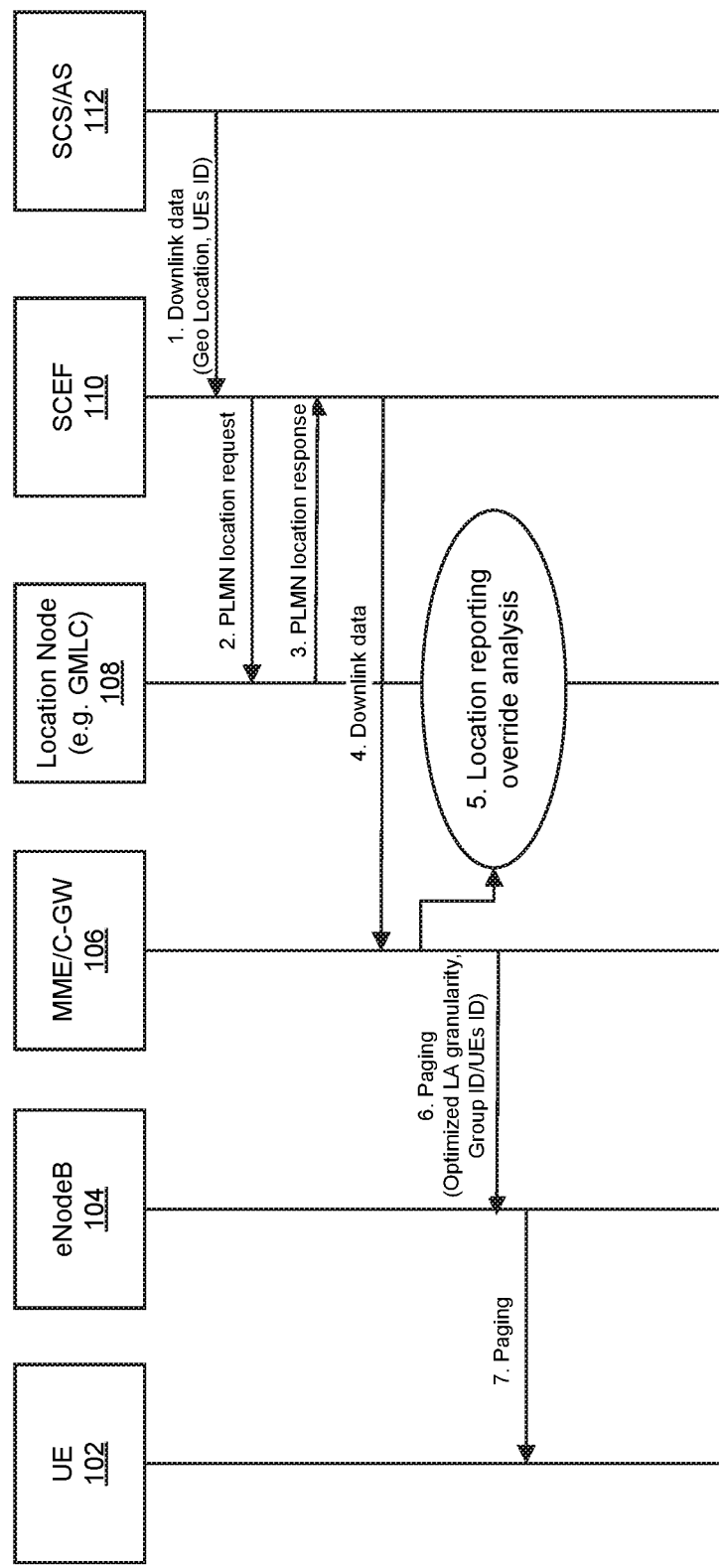
FIG. 1 illustrates signaling in a cellular network to achieve an optimized paging message based on a user equipment (UE) geolocation in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In upcoming years, cellular Internet of Things (CIoT) devices or machine type communication (MTC) devices are expected to be a growing area in the field of wireless communications. CIoT devices generally communicate (i.e., send or receive) small amounts of data to the network. The small amount of data typically ranges from a few bits to kilobits of data. As non-limiting examples, CIoT devices can include smart meters, health monitoring devices, sensors, etc. Unlike cellular technologies that generally involve high data rate services (e.g., voice, video), CIoT technology is expected to support a relatively large number of CIoT devices, but with much smaller data rates as compared to cellular devices. In addition, the relatively large numbers of CIoT devices are expected to support coverage enhancements to enable communication even when deployed inside buildings. Since CIoT devices are envisioned to last up to ten years without battery replacement, efficient power management is of importance to CIoT devices.

To reduce signaling overhead and battery consumption at CIoT devices, efficient paging area management is especially important for 3GPP CIoT systems. More specifically, in future deployments, 3GPP CIoT systems are expected to employ architectures that support efficient paging area management procedures for no/low mobility UEs. 3GPP CIoT systems are expected to consider dynamic environment radio condition changed, even for UEs with no/low mobility. 3GPP CIoT systems are expected to consider that CIoT UEs do not perform measurement reports to a CIoT radio access technology (RAT). In addition, 3GPP CIoT systems are expected to avoid frequent signaling exchange.

The present technology describes a paging optimization that uses a UE location reporting monitoring event. In one example, a location request can be transmitted from a service capability server (SCS) or application server (AS) to a Service Capability Exposure Function (SCEF). The location request can be triggered based on downlink data at the SCS/AS. In this example, the SCS/AS can send a known geographic location of the UE to the SCEF, and the SCEF can retrieve the UE's corresponding public land mobile network (PLMN) location on an external node interface.

In some scenarios, PLMN location reporting is already enabled at the SCS/AS, so an external node interface is not used to retrieve the UE's corresponding PLMN location. Rather, UE location reporting is directly undertaken by the SCEF. The supported location accuracy can be at a cell level, such as a cell global identity (CGI) level or evolved universal terrestrial radio access network (EUTRAN) cell global identity (ECGI) level. Alternatively, the supported location accuracy can be at a location area (LA) or tracking area (TA) or routing area (RA) level, or a presence area reporting level.

In one example, based on a known current location or a last known location of the UE, a corresponding PLMN location (e.g., cell ID) can be determined for the UE. Based on the PLMN location of the UE, a mobility management entity (MME) can identify a cell that includes the UE. The MME can identify the eNB corresponding to a precise UE location. The MME can transmit an enhanced paging message to an eNodeB including the precise location information (e.g., at a Cell ID level) of the UE. The eNodeB can send the paging message to the UE. Therefore, by optimizing the paging area based on the location report of the UE (as updated at the SCS/AS), radio interface resources and core network interface resources can be reduced.

In previous solutions, paging messages for a traditional UE are sent to a tracking area. In some cases, the tracking area can be relatively large and include a plurality of cells. The MME can provide a tracking area list to eNodeBs in the tracking area. The MME can provide the paging message to all of the eNodeBs that belong to the tracking area. Therefore, for a single UE, the paging message can be sent to multiple eNodeBs. Each of the eNodeB sends the paging message in their respective cell, even though the UE is only located in a single cell. Therefore, the existing paging mechanism is inefficient and wastes resources. Traditional UEs are generally mobile and when a UE moves from one tracking area to another tracking area, the UE can notify the network of the new tracking area. However, from the network perspective, the location of the UE may only be known at a tracking area granularity level.

However, as compared to traditional UEs, some UEs are immobile (e.g., CIoT devices and low mobility machine-to-machine (M2M) devices, such as smart meters etc.), and can be at known locations. Even when CIoT devices move from one location to another location, the CIoT devices generally do not transmit data when moving between locations. Therefore, in the present technology, the current location of the CIoT device can be provided to the network. Based on the UE's or CIoT device's current location, the paging message can be sent only in a cell that contains the CIoT device, rather than the paging message being sent in a plurality of cells that may or may not contain the CIoT device. The ability to page the CIoT device in a certain area (e.g., cell) reduces resources on the network side.

The present technology can be applicable to existing 3GPP radio access technologies (RATs), such as a Global System for Mobile Communications (GSM) Enhanced Data rates for GSM Evolution (EDGE) Radio Access Network (GERAN), Universal Terrestrial Radio Access Network (UTRAN) and E-UTRAN. The present technology can be applicable for 3GPP RATs for CIoT, such as narrow band CIoT (NB-CIoT), narrow band LTE (NB-LTE), narrow band IoT (NB-IoT), etc. In addition, the present technology can utilize cellular IoT gateway (C-GW) nodes.

In one configuration, the network can implement an optimized paging procedure, in which the network can send paging messages to a precise location area of a UE when there is an incoming message for the UE. The optimized paging procedure can involve a utilization of a location reporting monitoring event. The location reporting monitoring event allows the SCS/AS to request a location area of the UE. For example, the SCS/AS can request either a current location of the UE or a last known location of the UE. The accuracy of the location area received at the SCS/AS from the UE can be at a cell level (e.g., CGI/ECGI), eNodeB level, LA/TA/RA level, presence area reporting level, etc. In addition, the location area received at the SCS/AS from the UE can be in other formats, such as shapes (e.g., polygons, circles, etc.) or civic addresses (e.g., streets, districts etc.), as referenced by an Open Mobile Alliance (OMA) Presence API. The SCEF function can convert the location area of the UE (which is received at the SCS/AS from the UE) to a 3GPP location area (e.g., a PLMN location) by using a location node. This information can be updated on the network, based on the granularity of the 3GPP location area, as obtained from the location node.

In one configuration, the network can perform an optimized paging procedure by deriving a 3GPP location area (e.g., PLMN location) of the UE from a geolocation of the UE. For example, a last known PLMN location (e.g., ECGI, LA/RA/TA) for the UE can be retrieved from the location node based on the UE's geolocation information (e.g., address, polygons, circles). The last known PLMN location can be identified at the location node based on UE geolocation input from the SCEF. The location node can include a GMLC, or the location node can include another type of node that provides PLMN specific locations based on the UE's geolocation information. The optimized paging procedure can be for a specific UE or more than one UE in a specific geolocation. For example, the SCS/AS can provide a group ID when paging messages are for more than one UE or individual UE IDs.

As a result of deriving the PLMN location based on the UE geolocation information, the MME/C-GW can send paging messages to an accurate location area. For example, the MME/C-GW can send paging messages to a specific cell based on the last known PLMN location (e.g., cell ID). An override and increase in granularity of location area can be validated by the MME/C-GW, and the update from the external node with location services (LCS) capabilities can occur based on a time stamp of the location reporting event and a granularity level.

In one example, a C-GW or cellular IoT access gateway can provide functional capabilities of a serving gateway (S-GW), mobility management entity (MME) and Packet Data Network Gateway (PGW).

FIG. 1 illustrates exemplary signaling in a cellular network to achieve an optimized paging message based on a user equipment (UE) geolocation. In action 1, a service capability server (SCS)/application server (AS) 112 can call an application programming interface (API) provided by a Service Capability Exposure Function (SCEF) 110. The SCS/AS 112 can call the SCEF 110 for delivery of a downlink data message to one or more UEs in a specific geographical location (e.g., address, polygon, and circle). In other words, the SCS/AS 112 can send the downlink data message to the SCEF 110, and the downlink data message can include a geolocation of a user equipment (UE) 102 that is to receive a paging message from the network. The SCS/AS 112 can know the UE's geolocation based on a previous location reporting monitoring enhancement (MONTE) event, in which the SCS/AS 112 requests the UE's geolocation. For example, the SCS/AS 112 can know a current geolocation of the UE 102 or a last known geolocation of the UE 102. In addition, the downlink data message transmitted from the SCS/AS 112 to the SCEF 110 can include a UE ID.

In action 2, the SCEF 110 can send a public land mobile network (PLMN) location request to a location node 108. The location node 108 can include mapping information that enables the location node 108 to map the geolocation of the UE 102 to a corresponding PLMN equivalent of the UE location area. For example, the location node 108 can identify a cell ID based on the geolocation of the UE 102. In one example, the location node 108 can be a Gateway Mobile Location Centre (GMLC), or the location node 108 can be a new node that provides PLMN specific locations based on a UE's geolocation information.

In action 3, the location node 108 can send a PLMN location response to the SCEF 110. The PLMN location response can include an equivalent PLMN location area of the UE 102.

In action 4, the SCEF 108 can forward the downlink data message to a mobility management entity (MME)/cellular IoT gateway (C-GW) 106. The downlink data message can include an updated location area of the UE 102. The updated location area of the UE 102 can be with respect to the previous location reporting MONTE (monitoring) event, in which the UE's geolocation was sent to the SCS/AS 112.

In action 5, the MME/C-GW 106 can perform a location reporting event override analysis based on the updated location area received from the SCEF 108. More specifically, the MME/C-GW 106 can decide whether or not to overwrite the updated location area received from the SCEF 108 with a location area of the UE 102 as updated in the MME/C-GW 106. In other words, the MME/C-GW 106 can perform the overwrite when stored location area information for the UE 102 at the MME/C-GW 106 is not as up to date as the updated location area received from the SCEF 108. The MME/C-GW 106 can compare a time stamp and a granularity level of the updated location area received from the SCEF 108. When the SCEF 108 provides an improved UE location area granularity (or a more recent location area of the UE), the MME/C-GW 106 can update its location area information for the UE 102. In other words, the MME/C-GW 106 can overwrite existing location information for the UE 102 with the updated location area received from the SCEF 108. As an example, if the MME/C-GW 106 obtains an ECGI associated with the UE's location from the SCEF 108, and the MME/C-GW 106 only contains a tracking area of the UE 102, then the MME/C-GW 106 can update its location area information for the UE 102 to include the ECGI received from the SCEF 108.

In one example, the MME/C-GW 106 can override the updated location area provided by the SCEF 108 when the updated location area information does not match with last known location information stored at the MME/C-GW 106. In this case, the MME/C-GW 106 does not update the UE's location area based on the updated location area received from the SCEF 108.

In action 6, the MME/C-GW 106 can deliver an enhanced paging message to an eNodeB 104 in a specific location that corresponds to the PLMN location of the UE 102. For example, the eNodeB 104 can be associated with a certain cell ID, and the cell ID can correspond to the PLMN location of the UE 102. The MME/C-GW 106 can send the paging message to only the eNodeB 104, as opposed to the MME/C-GW 106 sending the paging message to an entire tracking area list (which can include multiple eNodeBs). Thus, the paging message can include an optimized location area (LA) granularity level since the paging message is only sent in a cell that currently includes the UE 102 (based on the PLMN location of the UE 102). In addition, the paging message can include the UE(s) identity and/or a group ID when the paging message is to be sent to a group of UEs in the cell.

In action 7, the eNodeB 104 cans end the enhanced paging message to the UE 102. The paging message is 'enhanced' because the paging message is only sent in a cell that currently includes the UE 102, as opposed to the paging message being sent in multiple cells formed by multiple eNodeBs.

Figure 2:
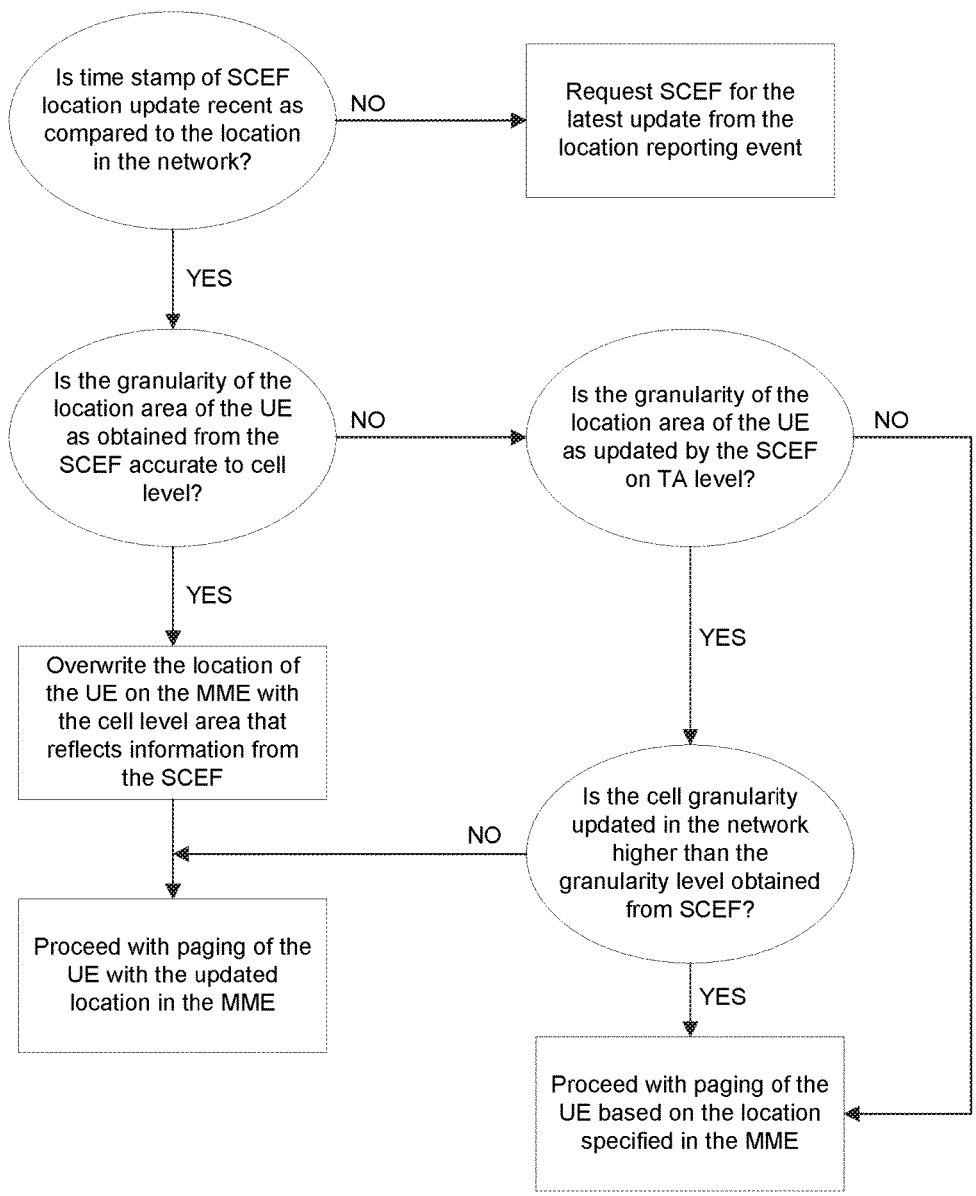
FIG. 2 illustrates a location reporting event override procedure in accordance with an example.

FIG. 2 illustrates an exemplary location reporting event override procedure. The location reporting override procedure can be performed at a mobility management entity (MME)/cellular IoT gateway (C-GW). During the procedure, the MME/C-GW can compare updated location area information for a user equipment (UE) to location area information for the UE that is currently stored at the MME/C-GW. The MME/C-GW can receive the updated location area information from a Service Capability Exposure Function (SCEF). When the updated location area information received from the SCEF is more recent as compared to the location area information for the UE already stored at the MME/C-GW, the MME/C-GW can update the UE's location area information.

More specifically, the MME/C-GW can determine whether a time stamp of an SCEF location update (i.e., the UE's location as received from the SCEF) is more recent as compared to a UE location stored at the MME/C-GW. When the SCEF location update is not more recent, then the MME/C-GW can request the SCEF for a latest update from a location reporting event.

When the SCEF location update is more recent, the MME/C-GW can determine whether a granularity of the location area of the UE as obtained from the SCEF is accurate to a cell level. When the granularity is accurate to the cell level, the MME/C-GW can overwrite the location of the UE at the MME/C-GW with the cell level area that reflects the location information received from the SCEF. At this point, the MME/C-GW can proceed with paging the UE using the updated location of the UE (as received from the SCEF).

In one example, when the granularity is not accurate to the cell level, the MME/C-GW can determine whether a granularity level of the location area of the UE as updated by the SCEF on a tracking area (TA) level. If yes, the MME/C-GW can determine whether a granularity level of the location area received from the SCEF is higher than a granularity level stored at the MME/C-GW. Based on this, the MME/C-GW can proceed with paging the UE with the updated location of the UE (as received from the SCEF) or the MME/C-GW can proceed with paging the UE based on location area information already stored at the MME/C-GW.

In one example, when the MME/C-GW determines that a granularity level of the location area of the UE as updated by the SCEF is not at a tracking area (TA) level, the MME/C-GW can proceed with paging the UE based on location area information already stored at the MME/C-GW In one configuration, optimized paging can be performed in the network using monitoring enhancement (MONTE) user equipment (UE) location reporting. In this configuration, periodic location reporting is enabled in the network. As a result, a public land mobile network (PLMN) location area of a UE is periodically updated at a service capability server (SCS)/application server (AS) 112. For example, the PLMN location area can include an EUTRAN cell group identifier (ECGI) associated with the UE's geolocation. In addition, the SCS/AS 112 can transmit the PLMN location area of the UE to a Service Capability Exposure Function (SCEF). Therefore, in this configuration, since the UE's location is already in a PLMN format, a location node (or another type of external node) is not used to translate a geolocation of the UE to its 3GPP network equivalent location (e.g., PLMN location).

In one example, after a periodic UE location reporting event is registered at a home location register (HLR) of the network, updated UE location area obtained at the SCS/AS during a location monitoring event can be periodically sent to the SCEF. Thus, the UE location area can be periodically updated at the SCEF. In addition, the SCEF can send the updated UE location area to the MME/C-GW in the network. Based on the updated UE location area, the MME/C-GW can page the UE in a location area with increased granularity.

Figure 3:
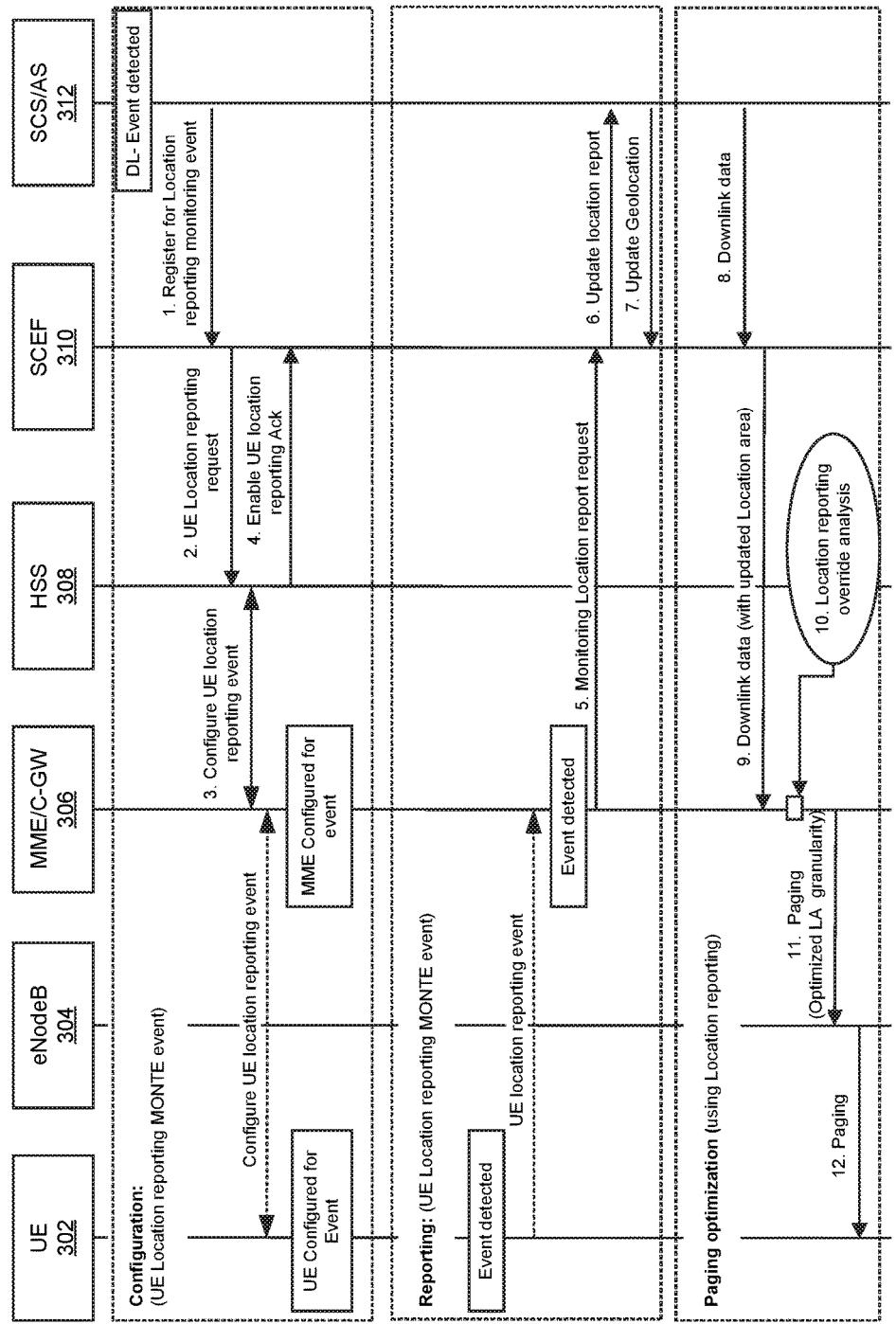
FIG. 3 illustrates signaling in a cellular network to achieve an optimized paging message based on a user equipment (UE) location reporting event in accordance with an example.

FIG. 3 illustrates exemplary signaling in a cellular network to achieve an optimized paging message based on a user equipment (UE) location reporting event. A location reporting monitoring event can be configured and reported in the cellular network to enable optimized paging messaging based on a UE location. In actions 1-4, a UE location reporting monitoring enhancement (MONTE) event can be configured. For example, in action 1, when there is downlink data to be sent by an SCS/AS 312 (which corresponds to a downlink event being detected), a geolocation of a user equipment (UE) 302 can be sent from the SCS/AS 312 to an SCEF 310. The geolocation of the UE 302 can already be known at the SCS/AS 312. The geolocation of the UE 302 can be sent to the SCEF 310 in order to obtain a PLMN location (e.g., ECGI) that corresponds to the UE's geolocation. The SCS/AS 312 can send a register for location reporting monitoring event to the SCEF 310 to enable UE location reporting. In addition, the SCS/AS 312 can indicate whether the location reporting monitoring event is for one-time or periodic reporting.

In action 2, the SCEF 310 can send a UE location reporting request to a home subscriber server (HSS) 308. In other words, the SCEF 310 can register with the HSS 308 for UE location reporting.

In action 3, the HSS 308 can configure a UE location reporting event with an MME/C-GW 306, which enables the MME/C-GW 306 to request a UE location from a UE location reporting monitoring event at the SCEF 310.

In one example, the MONTE event configuration can be further described in 3GPP TS 23.682. However, the existing procedure can be further enhanced by configuring the location reporting at a UE/CIoT device. The UE location configuration can include a location granularity (e.g., ECGI level), reporting periodicity, priority and/or other parameters. In addition, the UE location event configuration can be achieved using Open Mobile Alliance Device Management (OMA-DM) or other mechanisms, such as over-the-top (OTT) techniques.

In action 4, the HSS 308 can send an acknowledgement to the SCEF 310, and the acknowledgement can enable UE location reporting at the SCEF 310. In addition, the acknowledgement can indicate whether a location reporting event update from the 310 SCEF is a periodic event or a one-time event.

In actions 5-7, a reporting of a UE location reporting MONTE event can occur. The UE location event can be reported by the UE 302 (if UE configuration is enabled) or by the MME/C-GW 306 depending on the configuration. For example, in action 5, when a downlink data message arrives at the MME/C-GW 306 to be delivered to the UE 302, the MME/C-GW 306 can request the SCEF 310 for an updated location monitoring report of the UE. In other words, the MME/C-GW 306 can send the monitoring location report request to the SCEF 310. In action 6, the SCEF 310 can query the SCS/AS 312 for the location report of the UE 302, or the SCEF 310 can periodically request the location report from the SCS/AS 312. In action 7, the SCS/AS 312 can send a PLMN location (e.g., ECGI) of the UE 302 to the SCEF 310. In other words, the SCS/AS 312 can send an updated geolocation of the UE 302 to the SCEF 310. The SCS/AS 312 can send the PLMN location as a one-time event triggered by the downlink data message, or the SCS/AS 312 can periodically send the PLMN location to the SCEF 310.

In actions 8-12, a paging optimization can be achieved using the MONTE location reporting event. In action 8, when SCS/AS 312 has a downlink data message to deliver to the UE 302, the SCS/AS 312 can send the downlink data message to the SCEF 310. The downlink data message can be a trigger for an optimized paging mechanism, or the optimized paging mechanism can be triggered due to other events. In action 9, the SCEF 310 can have location information of the UE based on the UE location reporting monitoring event. In other words, the SCEF 310 does not have to query another node to determine the UE location information. The SCEF 310 can send the UE location information with the downlink data message to the MME/C-GW 306.

In action 10, the MME/C-GW 306 can perform a location reporting event override analysis based on the UE location area received from the SCEF 310. For example, the MME/C-GW 306 can determine whether or not to overwrite the location area information from the SCEF 310 with location area of the UE 302, as updated in the MME/C-GW 306. The MME/C-GW 306 can compare a granularity of the location area and a time stamp of the UE location information received from the SCEF 310 and location information of the UE 302 stored at the MME/C-GW 306. When the SCEF 310 provides a UE location area that is more recent and/or with improved granularity as compared to the UE location information stored at the MME/C-GW 306, the MME/C-GW location area can be updated with the UE location area that is more recent and/or with improved granularity. As an example, if the SCEF 310 provides an ECGI associated with the UE 302 and the MME/C-GW 306 only contains a tracking area of the UE 302, then the MME/C-GW 306 is updated with the information (i.e., ECGI) received from the SCEF 310. In one example, the MME/C-GW 306 can override the information provided by SCEF 310 when the information does not match with last known UE location information stored at the MME/C-GW 306.

In action 11, the MME/C-GW 306 can send an enhanced paging message to the eNodeB 304. The MME/C-GW 306 can deliver the enhanced paging area message to the eNodeB 304 in a specific location that corresponds to the PLMN location (e.g., ECGI) of the UE 302. For example, the eNodeB 304 can be associated with a certain cell ID, and the cell ID can correspond to the PLMN location (e.g., ECGI) of the UE 302. The MME/C-GW 306 can send the paging message to only the eNodeB 304, as opposed to the MME/C-GW 306 sending the paging message to an entire tracking area list (which can include multiple eNodeBs). Thus, the paging message can include an optimized location area (LA)

granularity level since the paging message is only sent in a cell that currently includes the UE 302 (based on the PLMN location of the UE 302).

In action 12, the eNodeB 304 can send the enhanced paging message to the UE 302 in a specific location area associated with the UE 302.

In one configuration, optimized paging can be performed for small data transmissions over a user plane. For small downlink data transmissions and non-Internet Protocol (non IP) data transmissions in ultra-low complexity, power constrained and low data-rate narrowband CIoT devices, a location report from a location monitoring event can be included in a message sent from an SCS/AS to an S-GW/P-GW. The P-GW can send, to an MME, downlink data notification along with a last known UE location based on the location monitoring event. The MME can validate a granularity and time stamp of the last known UE location, and a paging message can be delivered to an optimized paging area (e.g., a paging area that corresponds to the UE's location).

Figure 4:
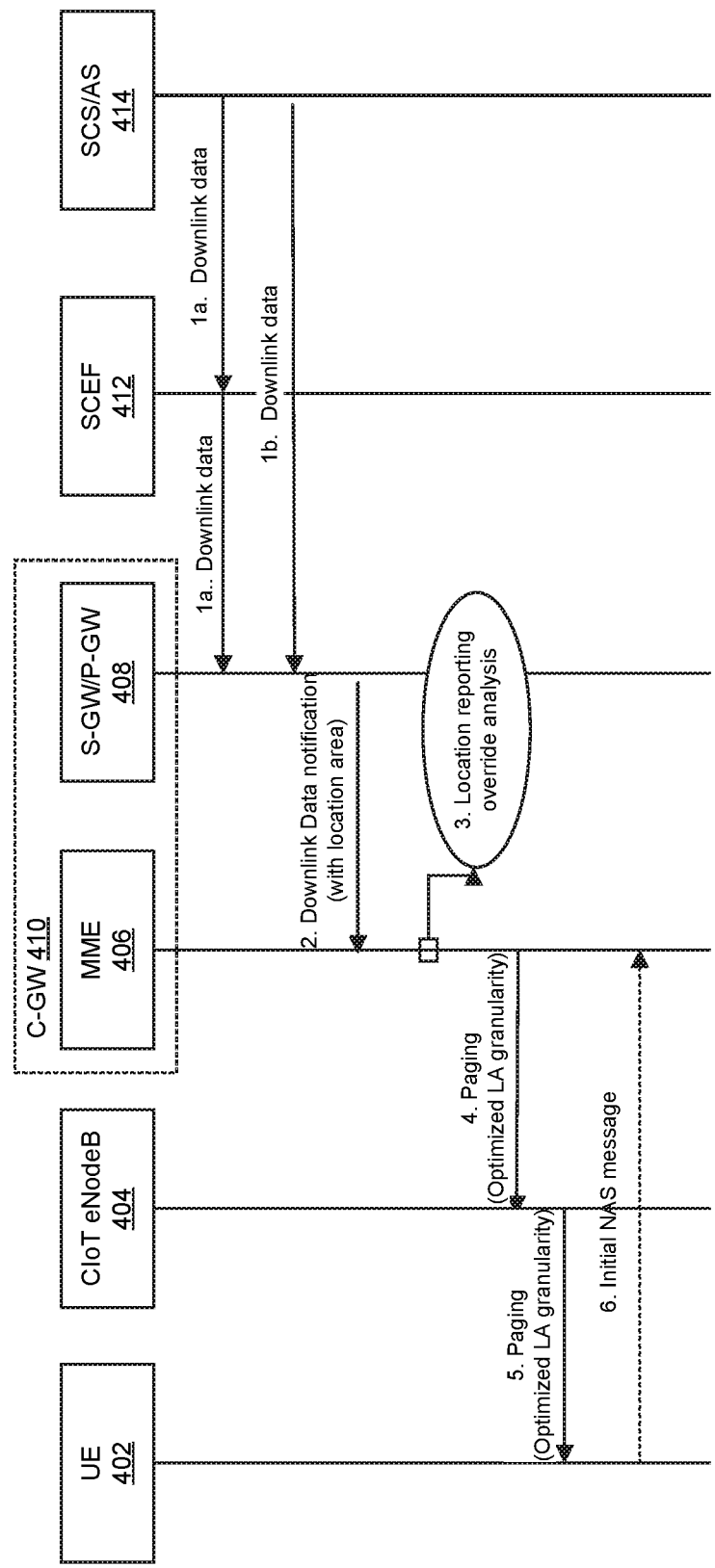
FIG. 4 illustrates signaling in a cellular network to achieve an optimized paging message for a small data transmission over a user plane in accordance with an example.

FIG. 4 illustrates exemplary signaling in a cellular network to achieve an optimized paging message for a small data transmission over a user plane. In action 1A, when a downlink data message is to be delivered from an SCS/AS 414 to a user equipment (UE) 402, the SCS/AS 414 can send the downlink data message to an SCEF 412. The downlink data message can include location area information of the UE 402. The SCS/AS 414 can be updated with the location area information of the UE 402 based on a location reporting monitoring enhancement (MONTE) event. The SCEF 412 can already have a public land mobile network (PLMN) equivalent location of the UE 402. As an example, the PLMN location can include an ECGI associated with the UE's location. Therefore, the SCEF 412 can send the downlink data message along with the PLMN location of the UE 402 to a corresponding serving gateway or packet data network gateway (S-GW/P-GW) 408.

Alternatively, in action 1B, the SCS/AS 414 can retrieve location information (e.g., a PLMN location) for the UE 402, for which a downlink data message is to be sent, from the SCEF 412. Therefore, in this case, the SCEF 412 can provide the UE location information to the SCS/AS. After receiving the UE location information, the SCS/AS 414 can directly send the downlink data message along with the UE location information to the S-GW/P-GW 408.

In one example, the S-GW/P-GW 408 and a mobility management entity (MME) 406 can be separate nodes based on an evolved packet core (EPC) architecture. Alternatively, the MME 406 can act as a CIoT gateway (C-GW), or the MME 406 and the S-GW/P-GW 408 can be collocated in a C-GW 410.

In action 2, the S-GW/P-GW 408 or the C-GW 410 can receive the downlink data message along with the location area along with the UE location area in a PLMN format (e.g., a ECGI) from the SCEF 412, and the S-GW/P-GW 408 or the C-GW 410 can send an enhanced downlink data notification (DDN) message along with UE location area information to the MME 406.

In action 3, the MME 406 can perform a location reporting event override analysis based on the UE location area received from the S-GW/P-GW 408. For example, the MME 406 can determine whether or not to overwrite the location area information from the S-GW/P-GW 408 with location area of the UE 402, as updated in the MME 406. The MME 406 can compare a granularity of the location area and a time stamp of the UE location information received from the S-GW/P-GW 408 and location information of the UE 402 stored at the MME 406. When the S-GW/P-GW 408 provides a UE location area that is more recent and/or with improved granularity as compared to the UE location information stored at the MME 406, the MME location area (with respect to the UE 402) can be updated with the UE location area that is more recent and/or with improved granularity.

In action 4, the MME 406 can send an enhanced paging message to a CIoT eNodeB 404. The MME 406 can deliver the enhanced paging area message to the CIoT eNodeB 404 in a specific location that corresponds to the PLMN location (e.g., ECGI) of the UE 402. For example, the CIoT eNodeB 404 can be associated with a certain cell ID, and the cell ID can correspond to the PLMN location (e.g., ECGI) of the UE 402. The MME 406 can send the paging message to only the CIoT eNodeB 404, as opposed to the MME 406 sending the paging message to an entire tracking area list (which can include multiple eNodeBs). Thus, the paging message can include an optimized location area (LA) granularity level since the paging message is only sent in a cell that currently includes the UE 402 (based on the PLMN location of the UE 402). In addition, the MME 406 can include a UE(s) identity (if provided by the S-GW/P-GW 408). The UE(s) identity can include a group ID when the paging message is to be sent to a group of UEs in the cell.

In action 5, the CIoT eNodeB 404 can send the enhanced paging message to the UE 402 in a specific location area associated with the UE 302.

In action 6, the UE 402 can receive the enhanced paging message from the CIoT eNodeB 404, and in response, the UE 402 can send an initial non-access stratum (NAS) message (e.g., a service request) to the MME 406 or the C-GW 410.

In one configuration, a UE's geographic location information in the SCS/AS, which is obtained from a location reporting MONE event, can be used by the network to implement a paging area optimization.

In one configuration, the paging area optimization can occur in response to a downlink data message notification triggered at the SCS/AS, and the SCS/AS can call an application programming interface (API) provided by the SCEF for a delivery of a downlink data message to one or more UEs in a specific geographical location (e.g., address, polygon, circle, etc.).

In one configuration, the SCEF can receive the downlink data message from the SCEF. The downlink data message can include a specific geographical location of the UE. After receiving the downlink data message and the UE's geographical location, the SCEF can contact an external node to obtain a PLMN equivalent address that corresponds to the specific geographical location of the UE. Therefore, based on the geolocation information (e.g. address, polygons, circles etc.) of the UE received at the SCEF from the SCS/AS, the SCEF can retrieve a last known PLMN location (e.g. ECGI, LA/RA/TA etc.) of the UE from the external node. The location node can include, for example, a Gateway Mobile Location Centre (GMLC), or a novel node that provides PLMN specific locations based on a geolocation input.

In one configuration, a PLMN location (e.g., cell ID) of the UE can be transmitted from the SCEF to a MME/C-GW along with the downlink data message. The MME/C-GW can identify a timestamp of the PLMN location sent by the SCS/AS and a location area granularity of the PLMN location, and based on the timestamp and the location area granularity, the MME/C-GW can overwrite location reporting event data with the PLMN location for the paging area optimization. In one example, the MME/C-GW can override the information (e.g., PLMN location) provided by the SCEF when the information does not match with last known location information for the UE stored at the MME/C-GW.

In one configuration, a paging message can be sent to an eNB, with the overwritten location area when the time stamp of the PLMN location is more recent as compared to a UE location area updated in the network, and the PLMN location offers improved granularity as compared to information stored in the MME/C-GW. For example, the location area can be overwritten when the MME/C-GW has the tracking area of UE, but the SCS/AS provides a cell area of the UE.

In one configuration, location reporting can already be enabled in a HSS of the network. For example, when a location reporting update event already involves a PLMN equivalent address of the UE, the SCS/AS can register for the location reporting update event in the network.

In one configuration, a location event monitoring update can be implemented in several manners. For example, the location event monitoring update can occur as a periodic event update or a onetime event, which can occur each time a downlink data message notification is triggered at the MME/C-GW. In one example, periodic location reporting can be implemented at the SCEF, in which the SCEF can periodically request the SCS/AS for location reporting updates for all the UEs. This facilitates the SCEF to be updated with the location area information of all the UEs. In one example, on the downlink data event, the SCEF can send location information of the UE along with the downlink data message to the MME/C-GW. The MME/C-GW can enable paging area optimization for location reporting enabled use cases.

In one configuration, with respect to non IP small data transmissions, the SCS/AS can detect a downlink data message, and the SCS/AS can send a location area of the UE from a monitoring event along with the downlink data message to the SCEF. The downlink data message can be sent with its PLMN equivalent of the UE location to the MME, and the MME can determine to overwrite location information of the UE stored in the MME/C-GW. A subsequent initial NAS message can be sent by the UE on receipt of a paging message with optimized location area granularity.

In one configuration, the MME/C-GW can include the UE(s) identity provided by the SCEF. In addition, the UE(s) identity can include a group ID for sending the downlink data message to a group of UEs.

Figure 5:
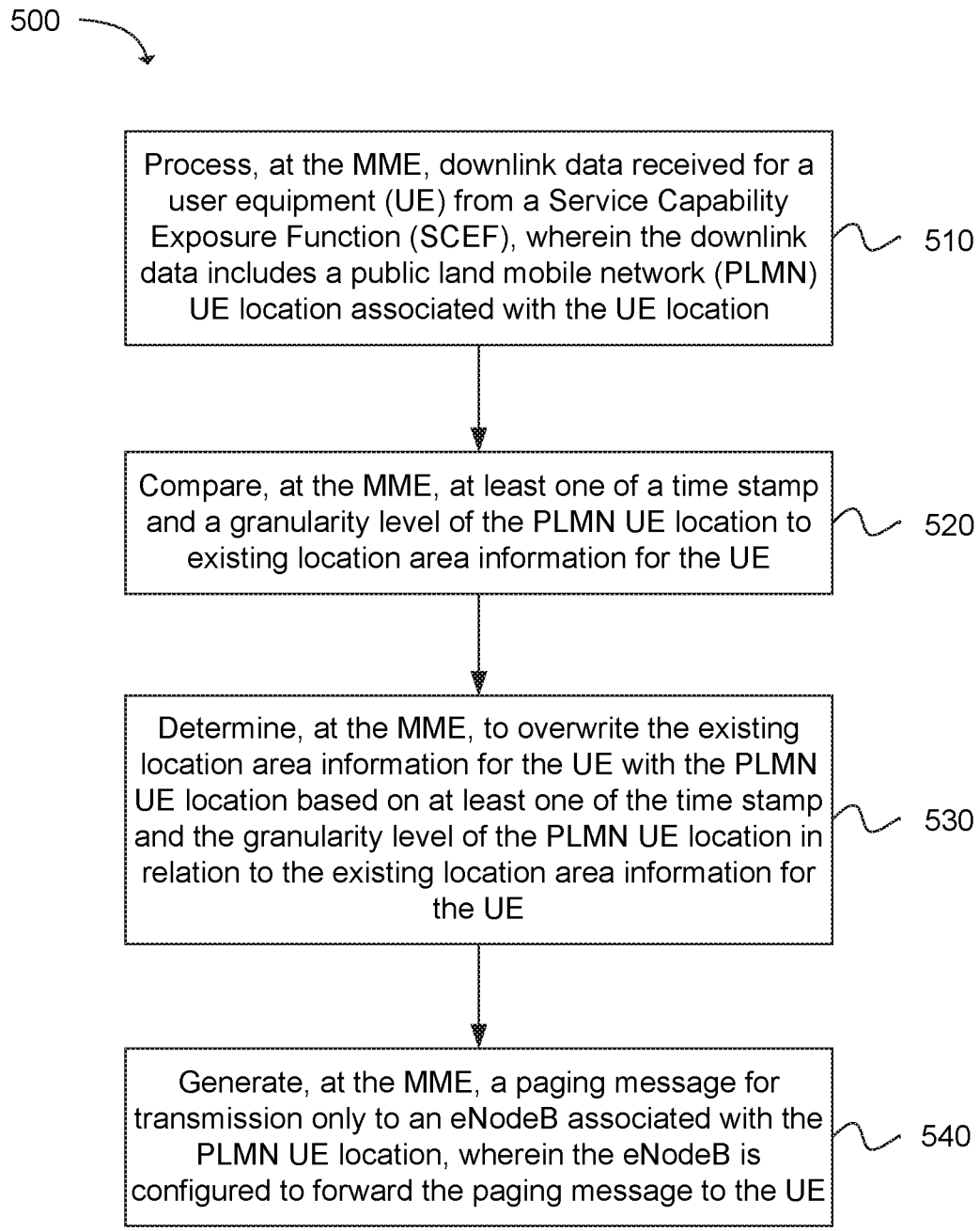
FIG. 5 depicts functionality of a mobility management entity (MME) operable to facilitate paging message transmissions using a user equipment (UE) location in accordance with an example.

Another example provides functionality 500 of a mobility management entity (MME) operable to facilitate paging message transmissions using a user equipment (UE) location, as shown in FIG. 5. The MME can comprise one or more processors and memory configured to: process, at the MME, downlink data received for a user equipment (UE) from a Service Capability Exposure Function (SCEF), wherein the downlink data includes a public land mobile network (PLMN) UE location associated with the UE location, as in block 510. The MME can comprise one or more processors and memory configured to: compare, at the MME, at least one of a time stamp and a granularity level of the PLMN UE location to existing location area information for the UE, as in block 520. The MME can comprise one or more processors and memory configured to: determine, at the MME, to overwrite the existing location area information for the UE with the PLMN UE location based on at least one of the time stamp and the granularity level of the PLMN UE location in relation to the existing location area information for the UE, as in block 530. The MME can comprise one or more processors and memory configured to: generate, at the MME, a paging message for transmission only to an eNodeB associated with the PLMN UE location, wherein the eNodeB is configured to forward the paging message to the UE, as in block 540.

Figure 6:
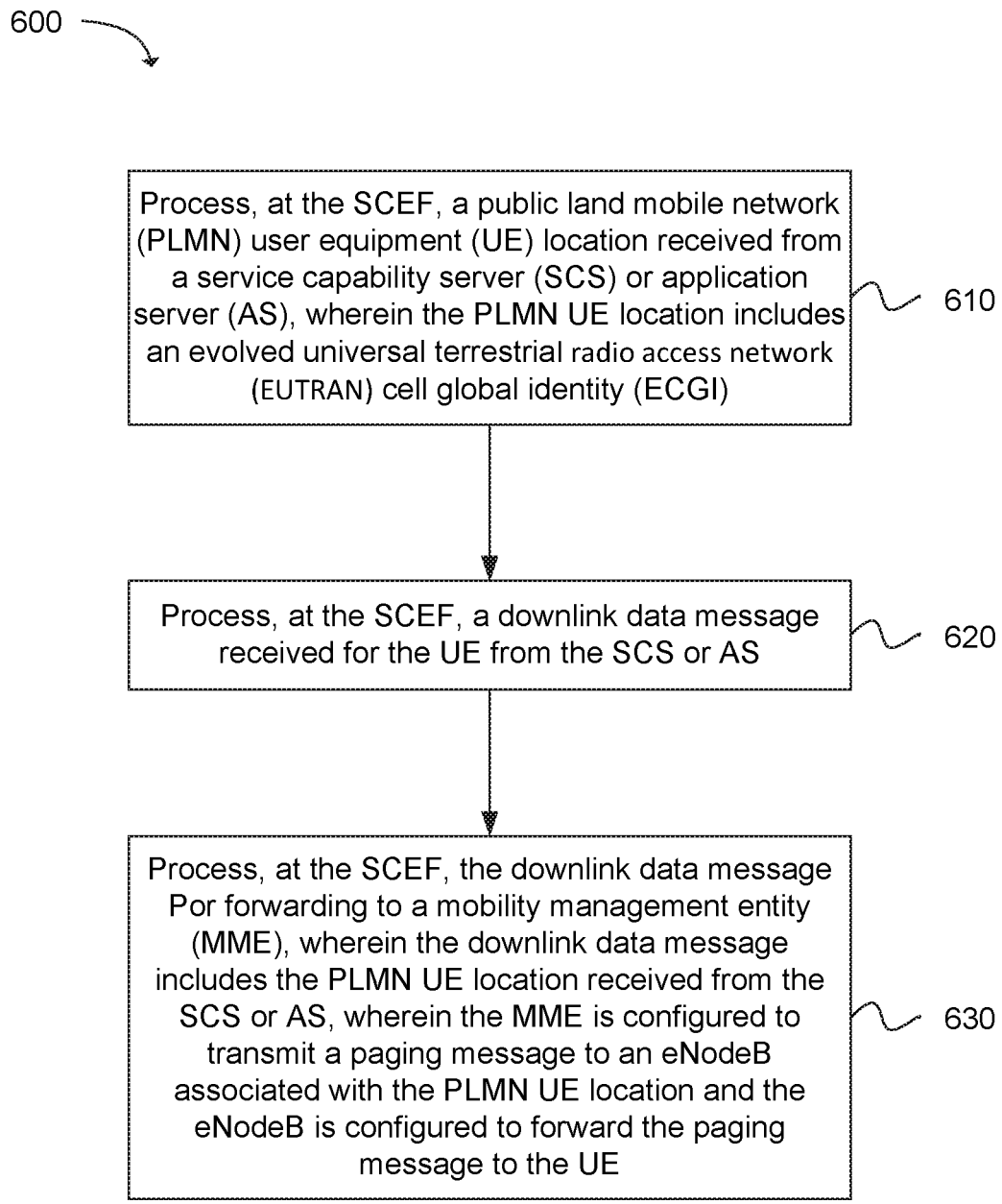
FIG. 6 depicts functionality of a Service Capability Exposure Function (SCEF) operable to facilitate paging message transmissions in accordance with an example.

Another example provides functionality 600 of a Service Capability Exposure Function (SCEF) operable to facilitate paging message transmissions, as shown in FIG. 6. The SCEF can comprise one or more processors and memory configured to: process, at the SCEF, a public land mobile network (PLMN) user equipment (UE) location received from a service capability server (SCS) or application server (AS), wherein the PLMN UE location includes an evolved universal terrestrial radio access network (EUTRAN) cell global identity (ECGI), as in block 610. The SCEF can comprise one or more processors and memory configured to: process, at the SCEF, a downlink data message received for the UE from the SCS or AS, as in block 620. The SCEF can comprise one or more processors and memory configured to: process, at the SCEF, the downlink data message for forwarding to a mobility management entity (MME), wherein the downlink data message includes the PLMN UE location received from the SCS or AS, wherein the MME is configured to transmit a paging message to an eNodeB associated with the PLMN UE location and the eNodeB is configured to forward the paging message to the UE, as in block 630.

Figure 7:
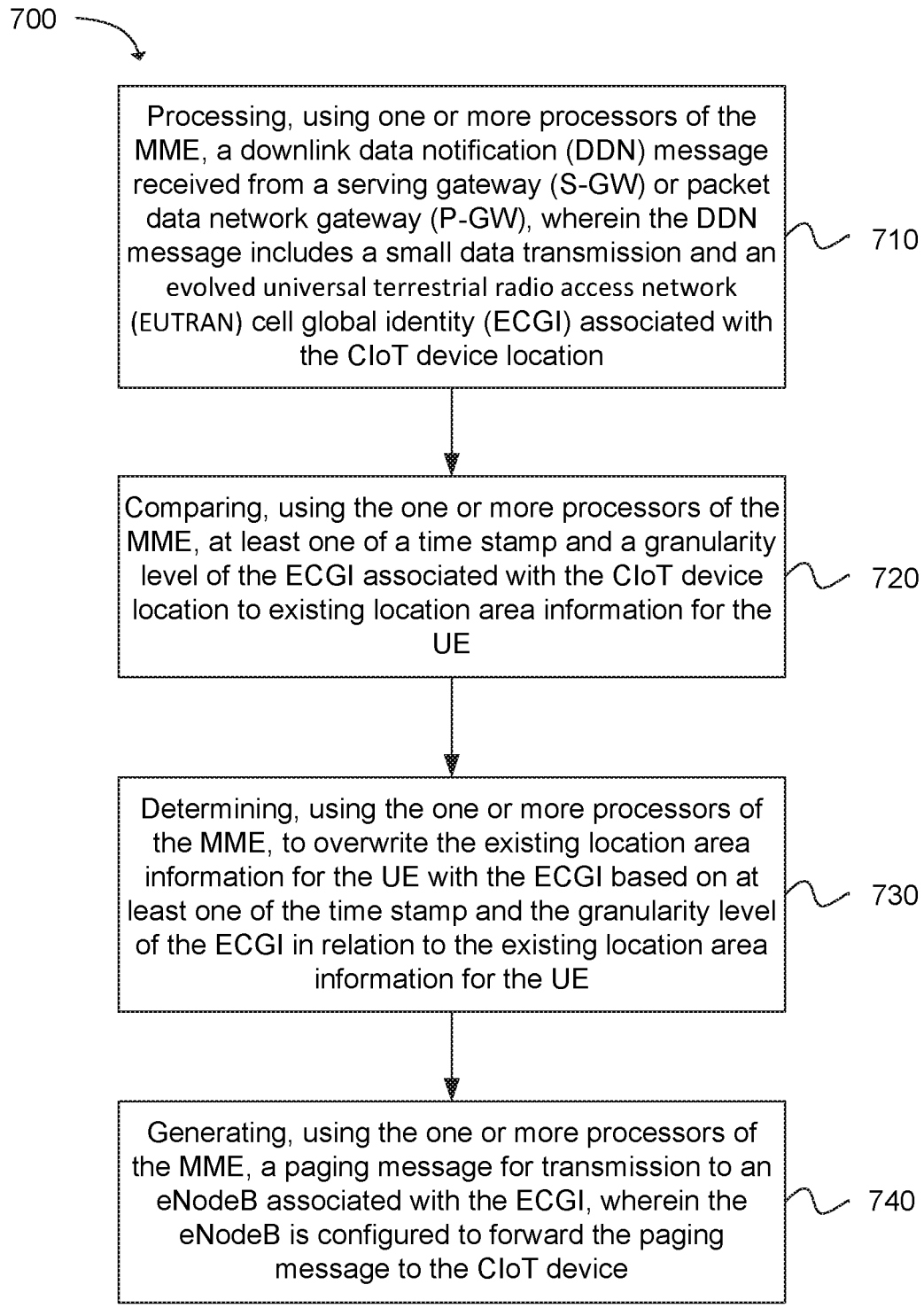
FIG. 7 depicts a flowchart of a machine readable storage medium having instructions embodied thereon for facilitating paging message transmissions at a mobility management entity (MME) using a cellular Internet of Things (CIoT) device location in accordance with an example.

Another example provides at least one machine readable storage medium having instructions 700 embodied thereon for facilitating paging message transmissions at a mobility management entity (MME) using a cellular Internet of Things (CIoT) device location, as shown in FIG. 7. The instructions can be executed on a machine, where the instructions are included on at least one computer readable medium or one non-transitory machine readable storage medium. The instructions when executed perform: processing, using one or more processors of the MME, a downlink data notification (DDN) message received from a serving gateway (S-GW) or packet data network gateway (P-GW), wherein the DDN message includes a small data transmission and an evolved universal terrestrial radio access network (EUTRAN) cell global identity (ECGI) associated with the CIoT device location, as in block 710. The instructions when executed perform: comparing, using the one or more processors of the MME, at least one of a time stamp and a granularity level of the ECGI associated with the CIoT device location to existing location area information for the UE, as in block 720. The instructions when executed perform: determining, using the one or more processors of the MME, to overwrite the existing location area information for the UE with the ECGI based on at least one of the time stamp and the granularity level of the ECGI in relation to the existing location area information for the UE, as in block 730. The instructions when executed perform: generating, using the one or more processors of the MME, a paging message for transmission to an eNodeB associated with the ECGI, wherein the eNodeB is configured to forward the paging message to the CIoT device, as in block 740.

Figure 8:
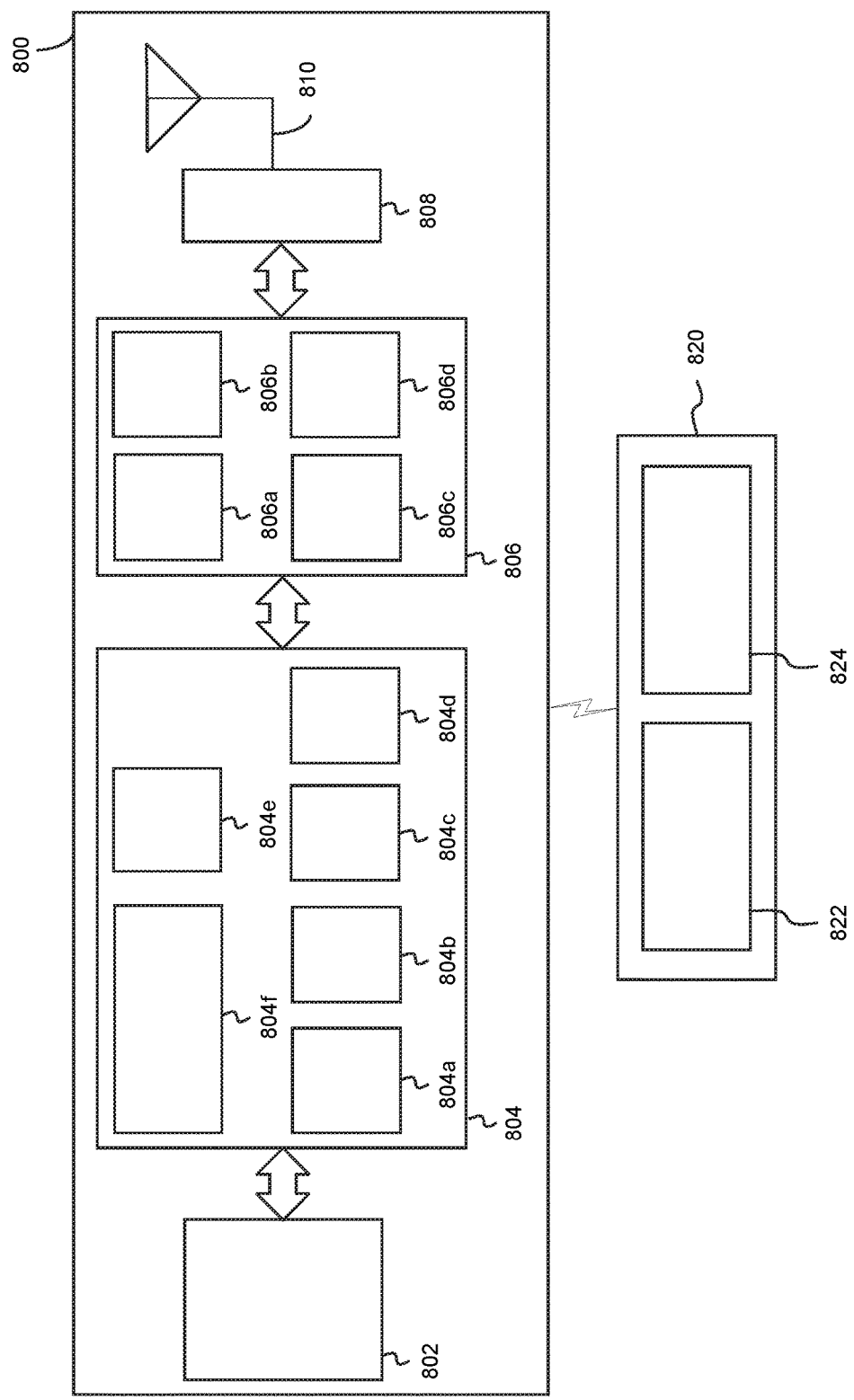
FIG. 8 illustrates a diagram of a wireless device (e.g., UE) in accordance with an example.

FIG. 8 provides an example illustration of a user equipment (UE) device 800, such as a wireless device, a mobile station (MS), a mobile wireless device, a mobile communication device, a tablet, a handset, or other type of wireless device. The UE device 800 can include one or more antennas configured to communicate with a node 820 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 820 can include one or more processors 822 and memory 824. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*. The filter circuitry 806*c* may include a low-pass filter (LPF), although the scope of the embodiments is not limited in this respect.

In some embodiments, the mixer circuitry 806*a* of the receive signal path and the mixer circuitry 806*a* of the transmit signal path may include two or more mixers and may be arranged for quadrature down-conversion and/or up-conversion respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* may be arranged for direct down-conversion and/or direct up-conversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

Figure 9:
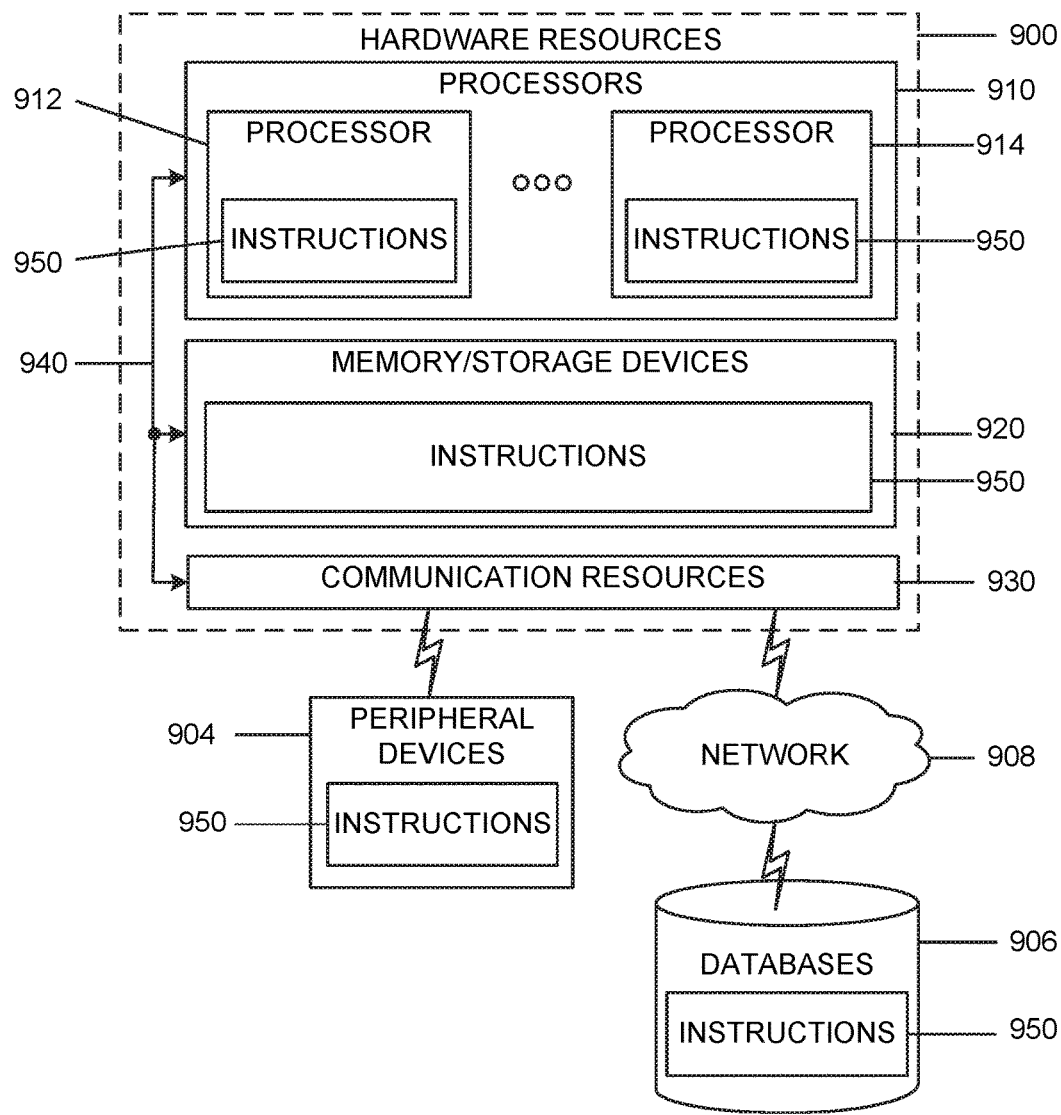
FIG. 9 illustrates a diagram of a wireless device (e.g., UE) in accordance with an example.

FIG. 9 is a block diagram illustrating components, according to some example embodiments, able to read instructions from a machine-readable or computer-readable medium (e.g., a machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which are communicatively coupled via a bus 940.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914. The memory/storage devices 920 may include main memory, disk storage, or any suitable combination thereof.

The communication resources 930 may include interconnection and/or network interface components or other suitable devices to communicate with one or more peripheral devices 904 and/or one or more databases 906 via a network 908. For example, the communication resources 930 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 and/or the databases 906. Accordingly, the memory of processors 910, the memory/storage devices 920, the peripheral devices 904, and the databases 906 are examples of computer-readable and machine-readable media.

Figure 10:
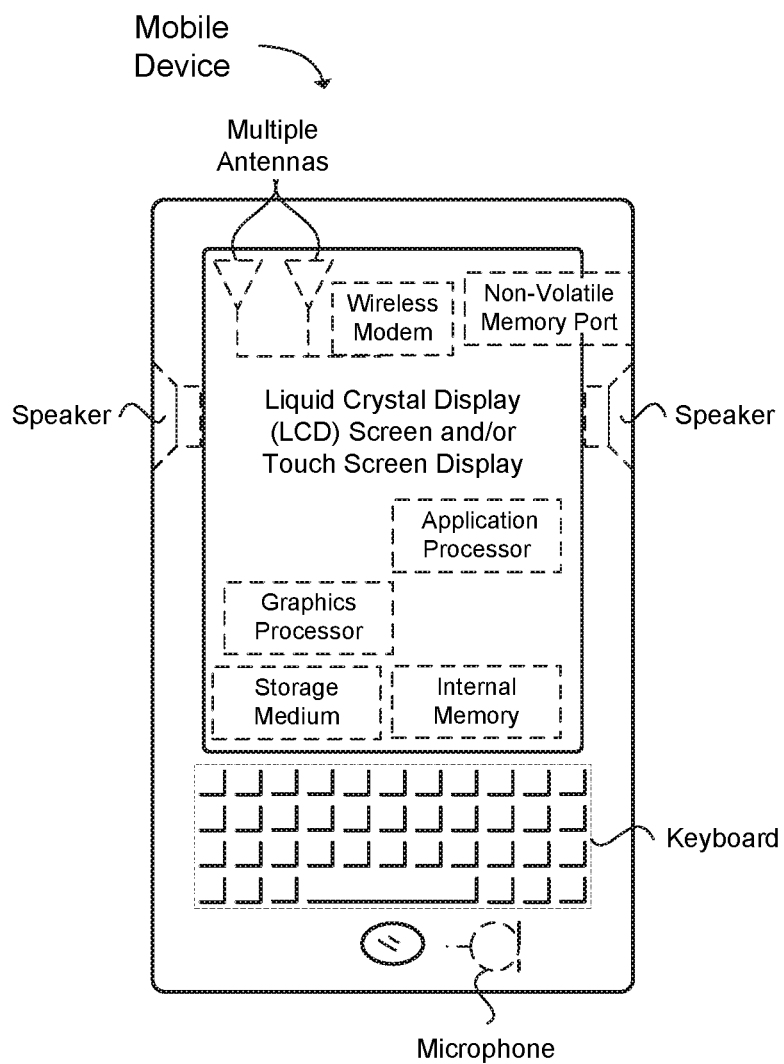

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a mobility management entity (MME) operable to facilitate paging message transmissions using a user equipment (UE) location, the apparatus comprising one or more processors and memory configured to: process, at the MME, downlink data received for a user equipment (UE) from a Service Capability Exposure Function (SCEF), wherein the downlink data includes a public land mobile network (PLMN) UE location associated with the UE location; compare, at the MME, at least one of a time stamp and a granularity level of the PLMN UE location to existing location area information for the UE; determine, at the MME, to overwrite the existing location area information for the UE with the PLMN UE location based on at least one of the time stamp and the granularity level of the PLMN UE location in relation to the existing location area information for the UE: and generate, at the MME, a paging message for transmission only to an eNodeB associated with the PLMN UE location, wherein the eNodeB is configured to forward the paging message to the UE.

Example 2 includes the apparatus of Example 1, further comprising a transceiver configured to: receive the downlink data for the UE from the SCEF; and transmit the paging message only to the eNodeB associated with the PLMN UE location.

Example 3 includes the apparatus of any of Examples 1 to 2, wherein the PLMN UE location includes an evolved universal terrestrial radio access network (EUTRAN) cell global identity (ECGI).

Example 4 includes the apparatus of any of Examples 1 to 3, wherein the PLMN UE location is determined from the UE location at a location node in communication with the SCEF, wherein the location node includes a Gateway Mobile Location Centre (GMLC).

Example 5 includes the apparatus of any of Examples 1 to 4, further configured to receive the downlink data for the UE from the SCEF via a service capability server (SCS) or application server (AS), wherein the UE location is known at the SCS or AS based on a location reporting monitoring event that enables the SCS or AS to request the UE location from the UE, wherein the UE location includes a current UE location or a last known UE location.

Example 6 includes the apparatus of any of Examples 1 to 5, wherein the MME transmits the paging message to only the eNodeB associated with the PLMN UE location of the UE and does not transmit the paging message to a plurality of eNodeBs included in one of: a tracking area list, a routing area list or a location area list.

Example 7 includes the apparatus of any of Examples 1 to 6, wherein: the UE location is represented at: a cell level, an eNodeB level, a location area (LA) or tracking area (TA) or routing area (RA) level, or a presence area reporting level; or the location of the UE is represented using at least one of: a civic address, a set of geographical coordinates or a shape format.

Example 8 includes the apparatus of any of Examples 1 to 7, further configured to generate the paging message for transmission from the eNodeB to a group of UEs that are located in a cell formed by the eNodeB.

Example 9 includes the apparatus of any of Examples 1 to 8, wherein the UE is a cellular Internet of Things (CIoT) device.

Example 10 includes an apparatus of a Service Capability Exposure Function (SCEF) operable to facilitate paging message transmissions, the apparatus comprising one or more processors and memory configured to: process, at the SCEF, a public land mobile network (PLMN) user equipment (UE) location received from a service capability server (SCS) or application server (AS), wherein the PLMN UE location includes an evolved universal terrestrial radio access network (EUTRAN) cell global identity (ECGI); process, at the SCEF, a downlink data message received for the UE from the SCS or AS; and process, at the SCEF, the downlink data message for forwarding to a mobility management entity (MME), wherein the downlink data message includes the PLMN UE location received from the SCS or AS, wherein the MME is configured to transmit a paging message to an eNodeB associated with the PLMN UE location and the eNodeB is configured to forward the paging message to the UE.

Example 11 includes the apparatus of Example 10, further configured to: process, at the SCEF, a request for a location monitoring report received from the MME; and process, at the SCEF, a request for a UE location report for transmission to the SCS or AS, wherein the SCS or AS is configured to transmit the PLMN UE location to the SCEF in response to receiving the request for the UE location report.

Example 12 includes the apparatus of any of Examples 10 to 11, wherein: the UE location is represented at: a cell level, an eNodeB level, a location area (LA) or tracking area (TA) or routing area (RA) level, or a presence area reporting level; or the UE location is represented using at least one of: a civic address, a set of geographical coordinates or a shape format.

Example 13 includes the apparatus of any of Examples 10 to 12, wherein the PLMN UE location is received from the SCS or AS periodically or the PLMN UE location is received as a one-time event triggered by the downlink data message at the SCS or AS.

Example 14 includes the apparatus of any of Examples 10 to 13, wherein the UE is a cellular Internet of Things (CIoT) device, wherein the UE includes at least one of an antenna, a touch sensitive display screen, a speaker, a microphone, a graphics processor, an application processor, a baseband processor, an internal memory, a non-volatile memory port, and combinations thereof.

Example 15 includes at least one machine readable storage medium having instructions embodied thereon for facilitating paging message transmissions at a mobility management entity (MME) using a cellular Internet of Things (CIoT) device location, the instructions when executed perform the following: processing, using one or more processors of the MME, a downlink data notification (DDN) message received from a serving gateway (S-GW) or packet data network gateway (P-GW), wherein the DDN message includes a small data transmission and an evolved universal terrestrial radio access network (EUTRAN) cell global identity (ECGI) associated with the CIoT device location; comparing, using the one or more processors of the MME, at least one of a time stamp and a granularity level of the ECGI associated with the CIoT device location to existing location area information for the UE; determining, using the one or more processors of the MME, to overwrite the existing location area information for the UE with the ECGI based on at least one of the time stamp and the granularity level of the ECGI in relation to the existing location area information for the UE: and generating, using the one or more processors of the MME, a paging message for transmission to an eNodeB associated with the ECGI, wherein the eNodeB is configured to forward the paging message to the CIoT device.

Example 16 includes the at least one machine readable storage medium of Example 15, further comprising instructions which when executed perform the following: receiving, at the MME, an initial non-access stratum (NAS) message from the CIoT device after the paging message is received at the CIoT device from the eNodeB, wherein the initial NAS message includes a service request.

Example 17 includes the at least one machine readable storage medium of any of Examples 15-16, wherein the S-GW or P-GW is configured to receive the small data transmission and the ECGI associated with the CIoT device location directly from a service capability server (SCS) or application server (AS) and transmit the DDN message with the small data transmission and the ECGI to the MME.

Example 18 includes the at least one machine readable storage medium of any of Examples 15-17, wherein the S-GW or P-GW is configured to receive the small data transmission and the ECGI associated with the CIoT device location from a service capability server (SCS) or application server (AS) via a Service Capability Exposure Function (SCEF) and transmit the DDN message with the small data transmission and the ECGI to the MME.

Example 19 includes the at least one machine readable storage medium of any of Examples 15-18, wherein the MME and the S-GW or P-GW are collocated in a CIoT gateway (C-GW).

Example 20 includes the at least one machine readable storage medium of any of Examples 15-19, facilitating, at the MME, the paging message transmission for small data over a user plane in the PLMN.

Example 21 includes the at least one machine readable storage medium of any of Examples 15-20, wherein the paging message for transmission to the eNodeB includes an identifier (ID) associated with the CIoT device or a group ID associated with a group of CIoT devices that are to receive the paging message from the eNodeB.

Example 22 includes a mobility management entity (MME) operable to facilitate paging message transmissions using a cellular Internet of Things (CIoT) device location, the MME comprising: means for processing a downlink data notification (DDN) message received from a serving gateway (S-GW) or packet data network gateway (P-GW), wherein the DDN message includes a small data transmission and an evolved universal terrestrial radio access network (EUTRAN) cell global identity (ECGI) associated with the CIoT device location; means for comparing at least one of a time stamp and a granularity level of the ECGI associated with the CIoT device location to existing location area information for the UE; means for determining to overwrite the existing location area information for the UE with the ECGI based on at least one of the time stamp and the granularity level of the ECGI in relation to the existing location area information for the UE: and means for generating a paging message for transmission to an eNodeB associated with the ECGI, wherein the eNodeB is configured to forward the paging message to the CIoT device.

Example 23 includes the MME of Example 22, further comprising means for receiving, at the MME, an initial non-access stratum (NAS) message from the CIoT device after the paging message is received at the CIoT device from the eNodeB, wherein the initial NAS message includes a service request.

Example 24 includes the MME of any of Examples 22 to 23, wherein the S-GW or P-GW is configured to receive the small data transmission and the ECGI associated with the CIoT device location directly from a service capability server (SCS) or application server (AS) and transmit the DDN message with the small data transmission and the ECGI to the MME.

Example 25 includes the MME of any of Examples 22 to 24, wherein the S-GW or P-GW is configured to receive the small data transmission and the ECGI associated with the CIoT device location from a service capability server (SCS) or application server (AS) via a Service Capability Exposure Function (SCEF) and transmit the DDN message with the small data transmission and the ECGI to the MME.

Example 26 includes the MME of any of Examples 22 to 25, wherein the MME and the S-GW or P-GW are collocated in a CIoT gateway (C-GW).

Example 27 includes the MME of any of Examples 22 to 26, further comprising means for facilitating, at the MME, the paging message transmission for small data over a user plane in the PLMN.

Example 28 includes the MME of any of Examples 22 to 27, wherein the paging message for transmission to the eNodeB includes an identifier (ID) associated with the CIoT device or a group ID associated with a group of CIoT devices that are to receive the paging message from the eNodeB.

Example 29 includes an apparatus of a mobility management entity (MME) operable to facilitate paging message transmissions using a user equipment (UE) location, the apparatus comprising one or more processors and memory configured to: process, at the MME, downlink data received for a user equipment (UE) from a Service Capability Exposure Function (SCEF), wherein the downlink data includes a public land mobile network (PLMN) UE location associated with the UE location; compare, at the MME, at least one of a time stamp and a granularity level of the PLMN UE location to existing location area information for the UE; determine, at the MME, to overwrite the existing location area information for the UE with the PLMN UE location based on at least one of the time stamp and the granularity level of the PLMN UE location in relation to the existing location area information for the UE: and generate, at the MME, a paging message for transmission only to an eNodeB associated with the PLMN UE location, wherein the eNodeB is configured to forward the paging message to the UE.

Example 30 includes the apparatus of Example 28, further comprising a transceiver configured to: receive the downlink data for the UE from the SCEF; and transmit the paging message only to the eNodeB associated with the PLMN UE location.

Example 31 includes the apparatus of any of Examples 29 to 30, wherein: the PLMN UE location includes an evolved universal terrestrial radio access network (EUTRAN) cell global identity (ECGI); or the PLMN UE location is determined from the UE location at a location node in communication with the SCEF, wherein the location node includes a Gateway Mobile Location Centre (GMLC).

Example 32 includes the apparatus of any of Examples 29 to 31, further configured to: receive the downlink data for the UE from the SCEF via a service capability server (SCS) or application server (AS), wherein the UE location is known at the SCS or AS based on a location reporting monitoring event that enables the SCS or AS to request the UE location from the UE, wherein the UE location includes a current UE location or a last known UE location; or generate the paging message for transmission from the eNodeB to a group of UEs that are located in a cell formed by the eNodeB.

Example 33 includes the apparatus of any of Examples 29 to 32, wherein the MME transmits the paging message to only the eNodeB associated with the PLMN UE location of the UE and does not transmit the paging message to a plurality of eNodeBs included in one of: a tracking area list, a routing area list or a location area list.

Example 34 includes the apparatus of any of Examples 29 to 33, wherein: the UE location is represented at: a cell level, an eNodeB level, a location area (LA) or tracking area (TA) or routing area (RA) level, or a presence area reporting level; or the location of the UE is represented using at least one of: a civic address, a set of geographical coordinates or a shape format.

Example 35 includes the apparatus of any of Examples 29 to 34, wherein the UE is a cellular Internet of Things (CIoT) device.

Example 36 includes an apparatus of a Service Capability Exposure Function (SCEF) operable to facilitate paging message transmissions, the apparatus comprising one or more processors and memory configured to: process, at the SCEF, a public land mobile network (PLMN) user equipment (UE) location received from a service capability server (SCS) or application server (AS), wherein the PLMN UE location includes an evolved universal terrestrial radio access network (EUTRAN) cell global identity (ECGI); process, at the SCEF, a downlink data message received for the UE from the SCS or AS; and process, at the SCEF, the downlink data message for forwarding to a mobility management entity (MME), wherein the downlink data message includes the PLMN UE location received from the SCS or AS, wherein the MME is configured to transmit a paging message to an eNodeB associated with the PLMN UE location and the eNodeB is configured to forward the paging message to the UE.

Example 37 includes the apparatus of Example 36, further configured to: process, at the SCEF, a request for a location monitoring report received from the MME; and process, at the SCEF, a request for a UE location report for transmission to the SCS or AS, wherein the SCS or AS is configured to transmit the PLMN UE location to the SCEF in response to receiving the request for the UE location report.

Example 38 includes the apparatus of any of Examples 36 to 37, wherein: the UE location is represented at: a cell level, an eNodeB level, a location area (LA) or tracking area (TA) or routing area (RA) level, or a presence area reporting level; or the UE location is represented using at least one of: a civic address, a set of geographical coordinates or a shape format.

Example 39 includes the apparatus of any of Examples 36 to 38, wherein: the PLMN UE location is received from the SCS or AS periodically or the PLMN UE location is received as a one-time event triggered by the downlink data message at the SCS or AS; or the UE is a cellular Internet of Things (CIoT) device, wherein the UE includes at least one of an antenna, a touch sensitive display screen, a speaker, a microphone, a graphics processor, an application processor, a baseband processor, an internal memory, a non-volatile memory port, and combinations thereof.

Example 40 includes at least one machine readable storage medium having instructions embodied thereon for facilitating paging message transmissions at a mobility management entity (MME) using a cellular Internet of Things (CIoT) device location, the instructions when executed perform the following: processing, using one or more processors of the MME, a downlink data notification (DDN) message received from a serving gateway (S-GW) or packet data network gateway (P-GW), wherein the DDN message includes a small data transmission and an evolved universal terrestrial radio access network (EUTRAN) cell global identity (ECGI) associated with the CIoT device location; comparing, using the one or more processors of the MME, at least one of a time stamp and a granularity level of the ECGI associated with the CIoT device location to existing location area information for the UE; determining, using the one or more processors of the MME, to overwrite the existing location area information for the UE with the ECGI based on at least one of the time stamp and the granularity level of the ECGI in relation to the existing location area information for the UE: and generating, using the one or more processors of the MME, a paging message for transmission to an eNodeB associated with the ECGI, wherein the eNodeB is configured to forward the paging message to the CIoT device.

Example 41 includes the at least one machine readable storage medium of Example 40, further comprising instructions which when executed perform the following: receiving, at the MME, an initial non-access stratum (NAS) message from the CIoT device after the paging message is received at the CIoT device from the eNodeB, wherein the initial NAS message includes a service request; or facilitating, at the MME, the paging message transmission for small data over a user plane in the PLMN.

Example 42 includes the at least one machine readable storage medium of any of Examples 40-41, wherein: the S-GW or P-GW is configured to receive the small data transmission and the ECGI associated with the CIoT device location directly from a service capability server (SCS) or application server (AS) and transmit the DDN message with the small data transmission and the ECGI to the MME; or the S-GW or P-GW is configured to receive the small data transmission and the ECGI associated with the CIoT device location from a service capability server (SCS) or application server (AS) via a Service Capability Exposure Function (SCEF) and transmit the DDN message with the small data transmission and the ECGI to the MME.

Example 43 includes the at least one machine readable storage medium of any of Examples 40-42, wherein: the MME and the S-GW or P-GW are collocated in a CIoT gateway (C-GW); or the paging message for transmission to the eNodeB includes an identifier (ID) associated with the CIoT device or a group ID associated with a group of CIoT devices that are to receive the paging message from the eNodeB.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a mobility management entity (MME) operable to facilitate paging message transmissions using a user equipment (UE) location, the apparatus comprising one or more processors and memory configured to:
   process, at the MME, downlink data received for a user equipment (UE) from a Service Capability Exposure Function (SCEF), wherein the downlink data includes a public land mobile network (PLMN) UE location associated with the UE location;
   compare, at the MME, at least one of a time stamp and a granularity level of the PLMN UE location to existing location area information for the UE;
   determine, at the MME, to overwrite the existing location area information for the UE with the PLMN UE location based on at least one of the time stamp and the granularity level of the PLMN UE location in relation to the existing location area information for the UE; and
   generate, at the MME, a paging message for transmission only to an eNodeB associated with the PLMN UE location, wherein the eNodeB is configured to forward the paging message to the UE.

2. The apparatus of claim 1, further comprising a transceiver configured to:
   receive the downlink data for the UE from the SCEF; and
   transmit the paging message only to the eNodeB associated with the PLMN UE location.

3. The apparatus of claim 1, wherein the PLMN UE location includes an evolved universal terrestrial radio access network (EUTRAN) cell global identity (ECGI).

4. The apparatus of claim 1, wherein the PLMN UE location is determined from the UE location at a location node in communication with the SCEF, wherein the location node includes a Gateway Mobile Location Centre (GMLC).

5. The apparatus of claim 1, further configured to receive the downlink data for the UE from the SCEF via a service capability server (SCS) or application server (AS), wherein the UE location is known at the SCS or AS based on a location reporting monitoring event that enables the SCS or AS to request the UE location from the UE, wherein the UE location includes a current UE location or a last known UE location.

6. The apparatus of claim 1, wherein the MME transmits the paging message to only the eNodeB associated with the PLMN UE location of the UE and does not transmit the paging message to a plurality of eNodeBs included in one of: a tracking area list, a routing area list or a location area list.

7. The apparatus of claim 1, wherein:
   the UE location is represented at: a cell level, an eNodeB level, a location area (LA) or tracking area (TA) or routing area (RA) level, or a presence area reporting level; or
   the location of the UE is represented using at least one of: a civic address, a set of geographical coordinates or a shape format.

8. The apparatus of claim 1, further configured to generate the paging message for transmission from the eNodeB to a group of UEs that are located in a cell formed by the eNodeB.

9. The apparatus of claim 1, wherein the UE is a cellular Internet of Things (CIoT) device.

10. An apparatus of a Service Capability Exposure Function (SCEF) operable to facilitate paging message transmissions, the apparatus comprising one or more processors and memory configured to:
    process, at the SCEF, a public land mobile network (PLMN) user equipment (UE) location received from a service capability server (SCS) or application server (AS), wherein the PLMN UE location includes an evolved universal terrestrial radio access network (EU-TRAN) cell global identity (ECGI);
    process, at the SCEF, a downlink data message received for the UE from the SCS or AS; and
    process, at the SCEF, the downlink data message for forwarding to a mobility management entity (MME), wherein the downlink data message includes the PLMN UE location received from the SCS or AS, wherein the MME is configured to transmit a paging message to an eNodeB associated with the PLMN UE location and the eNodeB is configured to forward the paging message to the UE.

11. The apparatus of claim 10, further configured to:
    process, at the SCEF, a request for a location monitoring report received from the MME; and
    process, at the SCEF, a request for a UE location report for transmission to the SCS or AS, wherein the SCS or AS is configured to transmit the PLMN UE location to the SCEF in response to receiving the request for the UE location report.

12. The apparatus of claim 10, wherein:
    the UE location is represented at: a cell level, an eNodeB level, a location area (LA) or tracking area (TA) or routing area (RA) level, or a presence area reporting level; or
    the UE location is represented using at least one of: a civic address, a set of geographical coordinates or a shape format.

13. The apparatus of claim 10, wherein the PLMN UE location is received from the SCS or AS periodically or the PLMN UE location is received as a one-time event triggered by the downlink data message at the SCS or AS.

14. The apparatus of claim 10, wherein the UE is a cellular Internet of Things (CIoT) device, wherein the UE includes at least one of an antenna, a touch sensitive display screen, a speaker, a microphone, a graphics processor, an application processor, a baseband processor, an internal memory, a non-volatile memory port, and combinations thereof.

15. At least one non-transitory machine readable storage medium having instructions embodied thereon for facilitating paging message transmissions at a mobility management entity (MME) using a cellular Internet of Things (CIoT) device location, the instructions when executed perform the following:
- processing, using one or more processors of the MME, a downlink data notification (DDN) message received from a serving gateway (S-GW) or packet data network gateway (P-GW), wherein the DDN message includes a small data transmission and an evolved universal terrestrial radio access network (EUTRAN) cell global identity (ECGI) associated with the CIoT device location;
- comparing, using the one or more processors of the MME, at least one of a time stamp and a granularity level of the ECGI associated with the CIoT device location to existing location area information for the UE;
- determining, using the one or more processors of the MME, to overwrite the existing location area information for the UE with the ECGI based on at least one of the time stamp and the granularity level of the ECGI in relation to the existing location area information for the UE: and
- generating, using the one or more processors of the MME, a paging message for transmission to an eNodeB associated with the ECGI, wherein the eNodeB is configured to forward the paging message to the CIoT device.

16. The at least one non-transitory machine readable storage medium of claim 15, further comprising instructions which when executed perform the following: receiving, at the MME, an initial non-access stratum (NAS) message from the CIoT device after the paging message is received at the CIoT device from the eNodeB, wherein the initial NAS message includes a service request.

17. The at least one non-transitory machine readable storage medium of claim 15, wherein the S-GW or P-GW is configured to receive the small data transmission and the ECGI associated with the CIoT device location directly from a service capability server (SCS) or application server (AS) and transmit the DDN message with the small data transmission and the ECGI to the MME.

18. The at least one non-transitory machine readable storage medium of claim 15, wherein the S-GW or P-GW is configured to receive the small data transmission and the ECGI associated with the CIoT device location from a service capability server (SCS) or application server (AS) via a Service Capability Exposure Function (SCEF) and transmit the DDN message with the small data transmission and the ECGI to the MME.

19. The at least one non-transitory machine readable storage medium of claim 15, wherein the MME and the S-GW or P-GW are collocated in a CIoT gateway (C-GW).

20. The at least one non-transitory machine readable storage medium of claim 15, further comprising instructions which when executed perform the following: facilitating, at the MME, the paging message transmission for small data over a user plane in the PLMN.

21. The at least one non-transitory machine readable storage medium of claim 15, wherein the paging message for transmission to the eNodeB includes an identifier (ID) associated with the CIoT device or a group ID associated with a group of CIoT devices that are to receive the paging message from the eNodeB.

* * * * *